Feb. 19, 1963  B. D. STEINBERG  3,078,458
CLUTTER ELIMINATION SYSTEM
Filed April 29, 1953  3 Sheets-Sheet 1

INVENTOR.
BERNARD D. STEINBERG
BY
Brown, Jenks & Synnestvedt
AGENTS

INVENTOR.
BERNARD D. STEINBERG

Feb. 19, 1963  B. D. STEINBERG  3,078,458
CLUTTER ELIMINATION SYSTEM
Filed April 29, 1953  3 Sheets-Sheet 3

INVENTOR.
BERNARD D. STEINBERG
BY
Brown, Jenk & Lynnestvedt
AGENTS

United States Patent Office 3,078,458
Patented Feb. 19, 1963

3,078,458
CLUTTER ELIMINATION SYSTEM
Bernard D. Steinberg, Philadelphia, Pa., assignor, by mesne assignments, to Philco Corporation, Philadelphia, Pa., a corporation of Delaware
Filed Apr. 29, 1953, Ser. No. 351,960
13 Claims. (Cl. 343—7.7)

This invention relates to radar systems and more particularly to an improvement in systems for detecting relatively slow moving ground or surface targets from a relatively fast moving airborne radar system.

One preferred form of airborne moving target indication (AMTI) radar system comprises the usual transmitter, antenna and receiver system. Following the receiver is a video delay and substraction (DS) unit in which the video signals are separated into two channels. The signals in one channel are delayed for a time equal to an integral multiple of the pulse repetition period of the radar system and then subtracted from the undelayed video signals in the second channel. The system just described is a form of noncoherent radar system which makes use of the change of phase from pulse to pulse between moving target echoes and random ground clutter signals to distinguish echoes from fixed targets from echoes from moving targets. The term "random ground clutter" as used in this specification includes the random clutter signal returned from the surface of the sea, which is similar in nature to the clutter signal returned from the surface of the earth. If the radar system remained stationary in space from pulse to pulse, fixed target signals and ground clutter signals would have substantially constant amplitudes from pulse to pulse and would be eliminated in the delay and subtraction or cancellation unit. Echoes from moving targets, because of their changing phase from pulse to pulse, would not be completely cancelled in the delay and subtraction unit and would appear at the output thereof as the useful output signal of the radar system.

It has been found that the movement of an airborne radar system from pulse to pulse causes the echoes returned from random ground reflectors to vary in phase from pulse to pulse. As a result, the echoes returned from random ground reflectors and stationary objects are not completely cancelled in the cancellation unit. This change in phase of the random ground signal from pulse to pulse results both from the movement of the radar system along the ground track of the aircraft and from the movement of the antenna in azimuth as it scans the area surrounding the aircraft.

For the reasons just described, current AMTI radar systems operate moderately well in two small sectors centered along the forward and backward directions of the ground track, but such systems cannot detect moving ground targets at a relative bearing greater than about ±60° for a 200 knot aircraft or about ±20° for a 400 knot aircraft. At bearings greater than those mentioned above, the indicator and/or video amplifier stages of the radar system become saturated by the residual ground clutter signals so that contrast between moving target signals and surrounding ground clutter signals is lost.

Therefore it is an object of the present invention to provide an improved radar system in which the effect of residual ground clutter signals is completely eliminated.

It is a further object of the present invention to provide a simple novel airborne radar detection system having uniform ability to detect targets over an entire 360° scan.

It is a further object of the present invention to provide simple, novel means, which can easily be incorporated in existing radar systems, for completely eliminating the undesirable effects of random ground clutter.

In general, these and other objects of the invention are accomplished by generating a signal which is substantially proportional to the amplitude of the residual clutter signal at all azimuths of the scanning antenna. This generated signal is combined with the cancelled radar video signal, either in the video amplifier or in the intensity modulated indicator of the radar system, in such a manner that the ground clutter signal is effectively cancelled before saturation occurs. As a result, only moving target echo signals appear on the indicator of the system.

For a better understanding of the present invention together with other and further objects thereof, reference should now be made to the following detailed description of the invention which is to be read in conjunction with the accompanying drawings in which.

Figure 1:
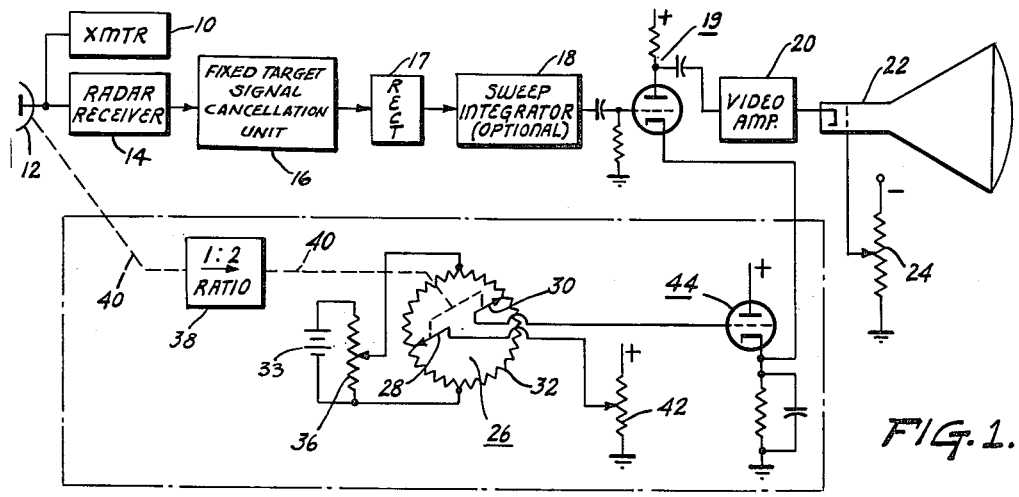
FIG. 1 is a diagram, partially in block form, of a preferred embodiment of the present invention.
Figure 3:
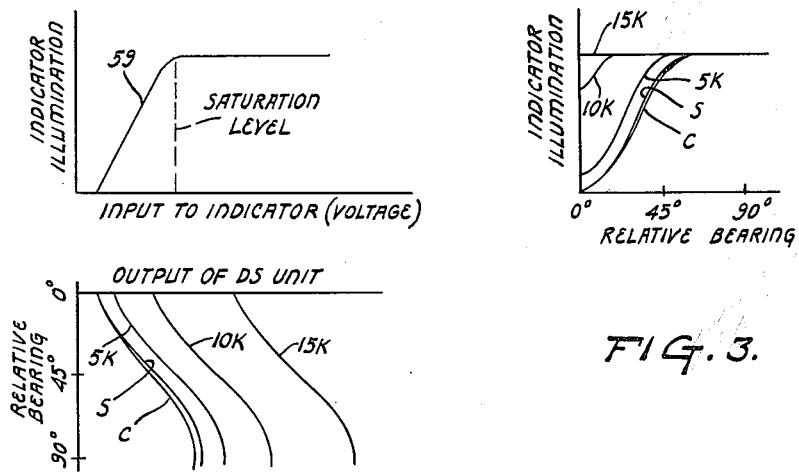
Figure 4:
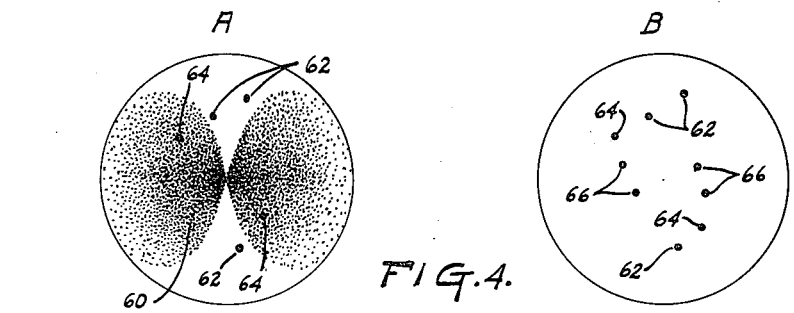
Figure 5:
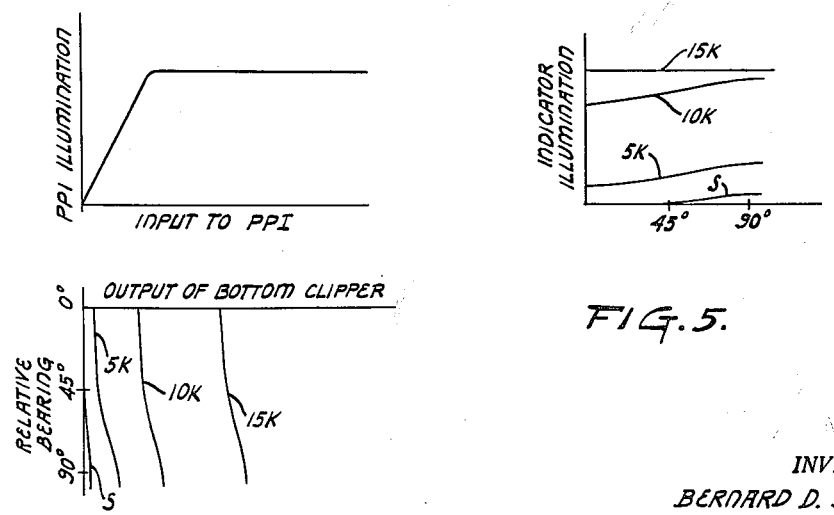
Figure 6:
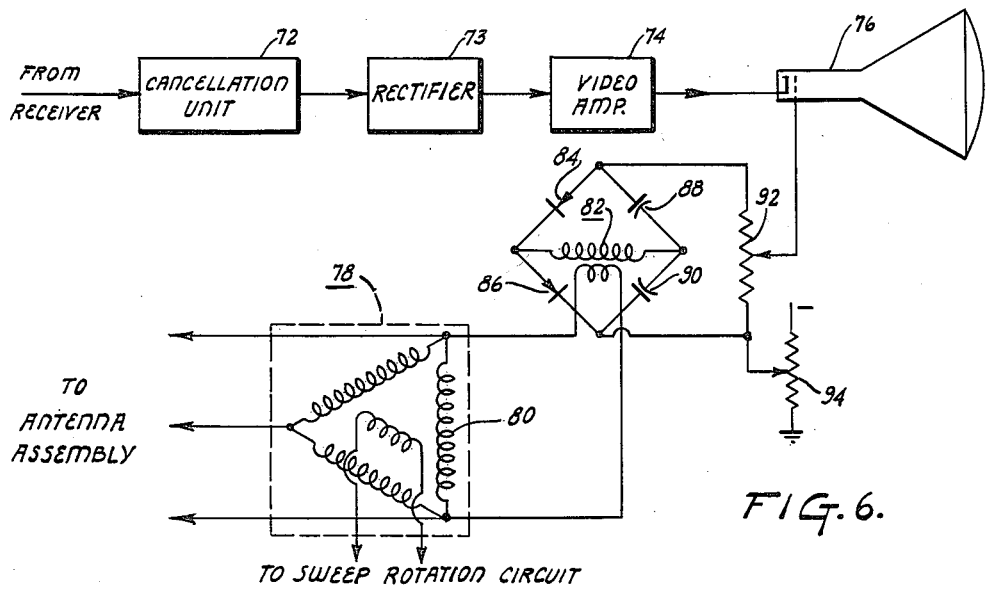
Figure 7:
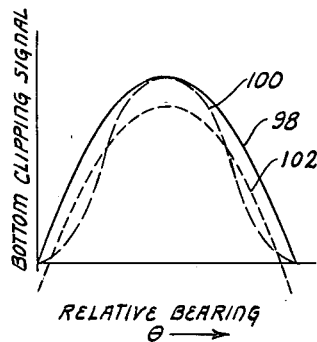
Figure 8:
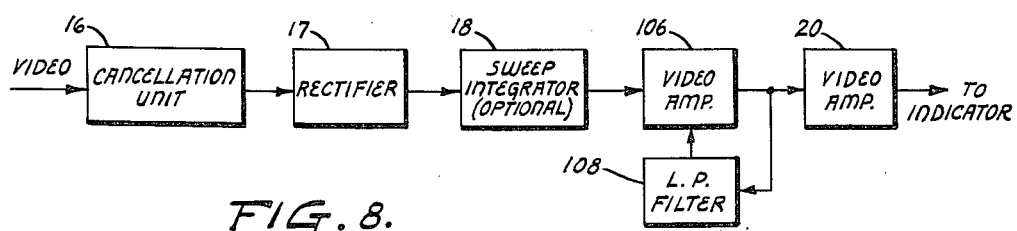

FIG. 3 includes three co-related plots of certain operating parameters of a typical prior art AMTI system;

FIGS. 4A and 4B are reproductions, respectively, of the indicator screens of conventional AMTI radar systems and the screen of a radar system constructed in accordance with the present invention depicting the same terrain;

FIG. 5 is a series of three co-related plots of certain operating parameters of the present invention;

FIG. 6 is a schematic diagram of a second embodiment of the present invention showing an alternative means for generating the control signal and an alternate point of connection to the radar system;

FIG. 7 is a plot of typical signal relationships in the system shown in FIG. 6;

FIG. 8 is a block diagram of a third embodiment of the invention showing a third means for generating the control signal;

The embodiment of the invention shown in FIG. 1 comprises a transmitter 10 for generating short duration, high amplitude pulses of radio frequency energy. Transmitter 10 supplies these energy pulses to antenna 12 which is arranged to scan in azimuth through 360° or any desired sector. A radar receiver 14 is connected to antenna 12 in the usual manner. A transmit-receiver or T-R switch (not shown in FIG. 1) is employed to provide the necessary isolation between transmitter 10 and receiver 14. Receiver 14 supplies video signals representing target reflected echoes of stationary and moving targets on the ground to fixed target signal cancellation unit 16. As suggested above, cancellation unit 16 comprises two signal channels with means in one of the channels for introducing a time delay equal to the pulse repetition period of transmitter 10 or an integral multiple thereof. A circuit, such as an amplifier having two input circuits, is employed to combine subtractively the signals present at the outputs of the two channels. It will be recognized that the system thus far described comprises a conventional noncoherent video delay and subtraction moving target detection system. A more complete description of a system of this type may be found in Radar System Engineering (Radiation Laboratory Series, Volume 1) McGraw-Hill Book Company, Inc., 1947. The output of cancellation unit 16 is rectified by a full wave rectifier 17, which may be linear or square law or which may have any other symmetrical characteristic. The rectified signal is supplied to a sweep integrator 18 which is included to improve the signal-to-noise ratio of the cancelled video signal. Sweep integrator 18 improves the operation of the present invention by averaging out large video signals resulting from noise or random fluctuations of the ground clutter signal. However, the invention will operate in the manner about to be described if sweep integrator 18 is omitted. Therefore sweep integrator 18 should be considered to be a preferred but not a necessary part of the present invention. Electrically, sweep integrator 18 is a form of comb filter having narrow passbands at harmonics of the pulse repetition frequency. Physically it may comprise a recirculating signal loop including a delay line having a delay time equal to the delay time of the delay line in the cancellation unit and an amplifier connecting the output of the delay line back to the input thereof. The gain of the amplifier is adjusted to cause the gain of the recirculating loop to be slightly less than unity. The output signal from sweep integrator 18 has an amplitude S equal to $$s_0 + As_1 + A^2 s_2 \ldots + A^n s_n$$

where $s_0$, $s_1$, $s_2$ etc. denote the successive amplitudes of the received signals from a particular target or range element, the subscript denoting the number of pulse repetition periods that the signal has been stored in the recirculating loop and $A$ is the gain of the recirculating loop.

A sweep integrator of the type described above is disclosed and claimed in the copending application of D. E. Sunstein et al., Serial No. 281,414, filed April 9, 1952, for Electrical System which is assigned to the assignee of the present invention.

The output signal from sweep integrator 18 is supplied to the control grid of a video amplifier stage 19. The output from stage 19 is supplied through additional video amplifier stages represented by block 20 to the cathode of cathode-ray tube 22. Cathode-ray tube 22 forms a part of an intensity modulated indicator of the PPI or B-scan type. The control grid of cathode-ray tube 22 is connected to a source of adjustable bias potential, comprising potentiometer 24, which is energized from a suitable D.-C. source represented by the ground and minus symbols (—) in FIG. 1. It will be obvious to those skilled in the art that, by simple modification of the circuit shown, the video signal may be applied to the control grid, and the bias potential to the cathode of the cathode-ray tube 22 or both signals may be applied to the same element.

The system of FIG. 1 further comprises a sinusoidal potentiometer 26 having movable taps 28 and 30 which contact the resistance element 32. A sinusoidal potentiometer is a circuit element having an output signal equal to $C \sin \theta$ where $C$ is the amplitude of the signal supplied to the potentiometer and $\theta$ is the angular position of a control element with respect to a reference position. Potentiometer 26 is energized by connecting one terminal of the resistance element 32 to the negative terminal of a source represented by battery 33 and a second terminal to the movable tap of potentiometer 36 which is connected in shunt with battery 33. Taps 28 and 30 are mechanically coupled to antenna 12 through a suitable ratio device 38. The mechanical coupling is represented by the broken line 40. Ratio device 38, which may comprise a simple two-to-one gear train, causes taps 28 and 30 to make two complete revolutions for each revolution of antenna 12 or, more generally, to move through twice the angle scanned by antenna 12. Tap 28 is connected to a source of adjustable bias potential comprising suitably energized potentiometer 42. Tap 30 is connected through a cathode follower isolation stage 44 to the cathode of video amplifier stage 19.

The operation of the system just described will be more readily understood if first the nature of the ground clutter signal to be eliminated is considered. Applicant has found that the output signal, from a standard delay and subtraction cancellation filter of the type described above, when preceded by a linear intermediate frequency amplifier in receiver 14 varies approximately as $k \sin^2 \theta$ where $\theta$ is the relative bearing to the target patch being illuminated and $k$ is a constant having a value determined by the velocity of the aircraft and the type of terrain being scanned (e.g. sea, wooded area, etc.). The reference for measuring relative bearing in this case is the ground track of the aircraft. When a moving target is present in an illuminated patch, the output of that patch is increased by some amount $a$ which is proportional to the size and velocity of the target. The output of the cancellation unit for a target patch at an angle $\theta$ containing a moving target can be shown to be substantially $$a + k \sin^2 \theta.$$

Figure 2:
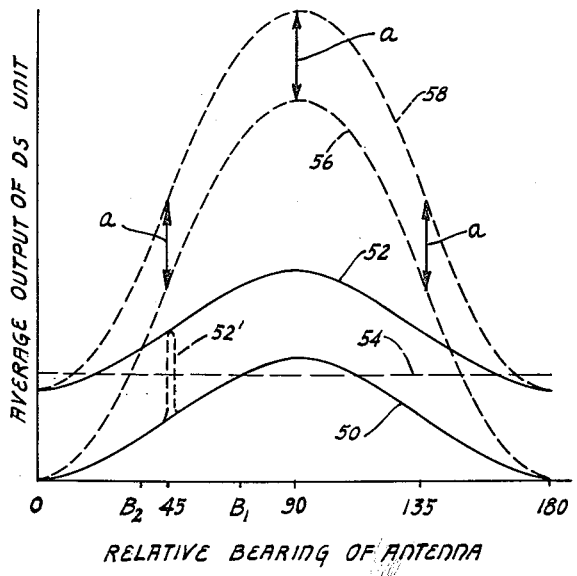
FIG. 2 is a plot showing the relationship between received signal amplitude after cancellation and relative bearing of the radar system.

Referring for the moment to FIG. 2, solid curve 50 is a plot of $k \sin^2 \theta$ while curve 52 is a plot of $a + k \sin^2 \theta$. It should be understood that curve 50 represents the average ground clutter signal and that, in the absence of sweep integrator 18, some signals resulting from ground clutter signal alone may appear in the output of cancellation unit 16 at an amplitude which far exceeds this average amplitude. These randomly occurring, high amplitude, ground clutter signals do not occur with sufficient frequency to mask a substantial area of the indicator screen but, unless they are eliminated before the video signal is supplied to cathode-ray tube 22, they may cause false target signals to appear on the indicator screen. The function of sweep integrator 18 is to eliminate such randomly occurring peaks without eliminating the similar but regularly recurring moving target signals. In the absence of rectifier 17, sweep integrator 18 would effectively cancel the moving target signals because of the pulse to pulse variations in these moving target signals. However, the full wave rectified video signals reflected from each target have an average value greater than zero and this average component functions as a constant amplitude, regularly recurring input pulse which will be integrated by sweep integrator 18. Rectifier 17 is generally required even in the absence of sweep integrator 18 because of the integrating action of the integrator screen. Curve 52' represents a single target at approximately 45° relative bearing. Curve 52 may be considered to be the trace of the peak of such a target signal as it is moved along curve 50. It will be remembered that the objective of the radar system now under consideration is to detect not all moving objects beneath the aircraft but only those moving objects which have a ground speed less than some rather small value, for example 15 knots. The value $a$ chosen for curve 52 represents a target moving at a velocity approaching the maximum velocity of interest. Slower moving targets of the same general characteristics would result in an output from the cancellation unit having an amplitude lying between curves 50 and 52.

The broken line 54 represents the level of video signal that will saturate the cathode-ray tube screen. For normal AMTI operation, the receiver gain and the indicator bias, which are the two variables under the control of the operator, are so adjusted that, along the ground track, the clutter is just marginally visible and moving targets at the maximum velocity of interest have an amplitude near the saturation level of the indicator. The ground track positions in FIG. 2 are at 0° and 180° relative bearing. As the antenna moves off the ground track, the amplitude of the clutter signal increases, thereby raising the clutter level on the indicator. At some bearing such as $B_1$ in FIG. 2, the indicator screen is completely saturated by clutter signal alone so that all contrast between clutter signal and target signals is eliminated. In the region between zero and bearing $B_1$, contrast between signals representing targets of different velocities, and between target signals and the random clutter signal, is greatly diminished although not entirely eliminated.

Broken-line curve 56 in FIG. 2 is a plot of $k' \sin^2 \theta$ for an aircraft velocity somewhat greater than that corresponding to curve 50. Curve 58 is the corresponding $a+k \sin^2 \theta$ curve. It will be noted that complete saturation by ground clutter signal now takes place at a smaller bearing angle $B_2$ which may be as small as 20° for a 400 knot aircraft.

The manner in which target information is lost, before complete saturation of the indicator by ground clutter takes place, is best illustrated by the curves of FIG. 3. The curves of the output of the cancellation (DS) unit versus relative bearing shown in FIG. 3 correspond to curves 50 and 52 or 56 and 58 of FIG. 2 except that they extend only to 90° relative bearing. Curve C represents random clutter, and curves S, 5K, 10K and 15K represent stationary targets and 5, 10 and 15 knot target signals, respectively, superimposed on the residual ground clutter signal. Curve 59 in FIG. 3 is the illumination characteristic curve of a typical intensity modulated indicator tube showing the relatively rapid saturation of the phosphor once the input signal exceeds the saturation level.

The plot of indicator illumination versus relative bearing in FIG. 3 indicates that the relative velocities of targets of the same general nature can be estimated along the ground track by the difference in the intensities of the signals on the indicator screen. However, as the relative bearing increases, slower targets begin to saturate the indicator screen and the entire contrast range is diminished. The curves in FIG. 3 are plotted for the condition in which the indicator bias is adjusted to give the optimum operating conditions for prior art systems of marginal visibility of clutter along the ground track which normally results in a saturated signal for a target having a velocity between 10 and 15 knots.

FIG. 4A is a view of an indicator screen of a typical prior art delay and subtraction AMTI system, in which shaded area 60 denotes saturation or near saturation of the indicator screen by ground clutter, dots 62 denote targets easily visible on the indicator and dots 64 denote targets which are marginally visible.

Turning once again to the circuit of FIG. 1, the signal between taps 28 and 30 will have the form $E \cos 2\theta$ where E is a constant having a value determined by the setting of potentiometer 36. The potential at the tap of potentiometer 42 will be a fixed value F determined by the setting of potentiometer 42. The total signal from tap 30 to ground becomes $F+E \cos 2\theta$, which is exactly equal to $k \sin^2 \theta$ if F and E are chosen correctly. The signal at tap 30 is supplied to the cathode of video amplifier 19 through cathode follower isolation stage 44. As explained above, the signal on the grid of stage 19 has the value $a+k \sin^2 \theta$, and the signal on the cathode is $k \sin^2 \theta$, leaving a net grid-to-cathode signal of $a$ which is the desired moving target signal. This signal $a$ is the only signal supplied to video amplifier 20. Since the effect of stage 19 is to remove the clutter signal from the bottom of the output signal of the cancellation unit, it is convenient to refer to this stage as a "bottom clipper." It should be noted that the signal $k \sin^2 \theta$ does not act as a gain control signal to reduce proportionally the amplitude of all signals supplied to the grid of stage 19 but is actually subtracted from the signal supplied to the grid of this stage.

Reference should now be made to FIG. 5 in which the curves correspond to the curves of FIG. 3 with the ground clutter signal eliminated and the indicator bias readjusted to give marginal visibility to stationary targets along the ground track. It should be apparent, from the plot of indicator illumination versus relative bearing in FIG. 5, that no saturation of the indicator occurs as a result of ground clutter and that targets at different velocities retain substantially the same relative contrasts for all bearing angles. It has been found that the target signal is not exactly constant for all bearing angles, as shown by the rising characteristic of the output of the bottom clipper versus relative bearing, but this change in amplitude is insignificant compared to the large shift in amplitude of target signal plus clutter signal encountered in prior art systems. Although a rising characteristic has been shown, it is to be understood that under certain circumstances the output of the bottom clipper may fall by a slight and equally unimportant amount as the relative bearing is increased. FIG. 4B is a view of an indicator screen of applicant's radar system. Targets 62 and 64 in FIG. 4B correspond to similarly numbered targets in FIG. 4A. It should be noted that targets 64, which were only marginally visible on the prior art indicator of FIG. 4A, are clearly visible on the indicator of FIG. 4B. Targets 66, at bearing angles near ±90°, are clearly visible on applicant's indicator but are completely obscured on the prior art indicator of FIG. 4A.

As mentioned above, the $k \sin^2 \theta$ variation of the residual ground clutter signal presupposes a linear intermediate frequency amplifier in receiver 14. If receiver 14 employs a linear-logarithmic or a logarithmic intermediate frequency amplifier, both of which are well known in the field of radar detection systems, the general nature of the variation of residual ground clutter signal with changes in relative bearing will remain the same although the variation may not exactly follow the $k \sin^2 \theta$ variation mentioned above. In most instances it will be possible to modify potentiometer 26 to cause the signal appearing at the cathode of stage 19 to closely approximate the expected residual ground clutter signal.

Other forms of signal ratio devices may be substituted for potentiometer 26 without departing from the invention. For example, signal resolvers having one or more coils energized from a source of alternating signal and a rotatable coil inductively associated with the energized coils are well known in the radar art and perform substantially the same functions as sine wave potentiometers. In many instances the use of signal resolvers of the type just described will simplify the circuitry of the bottom clipper since the input and output circuits of such resolvers are isolated from one another for D.-C. potentials.

The bottom clipper is not restricted in its application to radar systems having a single delay and subtraction type cancellation unit. In fact, the better the linear cancellation unit preceding the bottom clipper, the more efficient will be the operation of the bottom clipper. One combination that has been found to give highly satisfactory results is a radar system employing two delay and subtraction type cancellation units in cascade followed by a bottom clipper of the type described above. No mention has been made of the variation of residual clutter signal amplitude with range for the reason that this variation can be made relatively small and unimportant by properly shaping the radiation pattern of the system antenna.

FIG. 6 illustrates a second and somewhat simplified embodiment of the present invention. Cancellation unit 72, rectifier 73, video amplifier 74 and cathode-ray tube 76 are shown connected in the manner heretofore employed in prior art AMTI systems. Control transformer 78 may form a part of the sweep rotation circuit for cathode-ray tube 76. Control transformer 78 is connected to and energized by a signal transmitter which operates in synchronism with the scanning antenna to supply, to the 3-phase windings, signals which vary in amplitude as $\sin \theta$, $\sin (\theta+120°)$ and $\sin (\theta+240°)$ respectively, where $\theta$ is the bearing angle. In conventional radar systems the signal transmitter comprises a 3-phase selsyn, the rotor of which is geared to the antenna and which is energized by a signal having a frequency of 60 or 400 cycles per second so that the complete expression for the signal at the first-mentioned winding is $R \sin \theta \sin \omega t$ where R is a constant and the $\sin \omega t$ represents the 60 or 400 cycle variation.

The system thus far described is similar to conventional prior art systems and, from the following description, there will become apparent the ease with which prior art systems may be modified in accordance with the teachings of the present invention.

In accordance with the invention, the primary winding of a transformer 82 is connected in shunt with winding 80. The secondary winding of transformer 82 is connected to the input terminals of a full-wave bridge rectifier comprising rectifier units 84 and 86 and capacitors 88 and 90. The term "full wave" in this instance refers to the sin $\omega t$ variation of the signal. A potentiometer 92 is shunted across the output terminals of the bridge rectifier. The time constant of the circuit formed by capacitors 88 and 90 and potentiometer 92 is long compared to the sin $\omega t$ variation but short compared to the sin $\theta$ variation of the signal supplied thereto. Since the bridge is not phase sensitive, the signal appearing across resistor 92 has the form $|R \sin \theta|$ which is the equivalent of the full wave rectification of the sin $\theta$ modulation envelope, the brackets $|\ |$ denoting the instantaneous magnitude of $R \sin \theta$. One terminal of resistor 92 is connected to the movable tap of potentiometer 94 which is energized from a suitable source of direct potential represented by the minus sign (—). The control grid of cathode-ray tube 76 is connected to the movable tap of potentiometer 92 to complete the circuit shown in FIG. 6.

The circuit shown in FIG. 6 operates in much the same manner as the circuit shown in FIG. 1. As shown in FIG. 7, the $|R \sin \theta|$ signal 98, which appears across potentiometer 92, approximates the $k \sin^2 \theta$ variation 100 of the ground clutter signal. If potentiometer 94 is adjusted so that stationary targets along the ground track are just marginally visible, and potentiometer 92 is adjusted to provide complete cancellation of clutter at ±90° relative bearing, stationary targets and very slow moving targets will not appear on the indicator since the bottom clipping voltage represented by curve 100 is greater than the clutter amplitude at all points except 0, 180 and ±90 degree relative bearing. By adjusting the setting of potentiometer 94, the bottom clipping signal may be caused to have the variation shown by curve 102 in FIG. 7. It is apparent from a comparison of curves 102 and 98 that, if this adjustment is made, very slow moving targets may be displayed on the indicator at the expense of a slight decrease in clutter cancellation at 0° and ±90° relative bearing. Under normal operating conditions the residual clutter is far below the value necessary to saturate the indicator 76, so that the only adverse effect of incompelte cancellation of the clutter is a slight decrease in the contrast range of the targets for certain bearing angles.

It will be clear to those familiar with the operation of control transformers that the signal appearing across coil 80 will have one phase as $\theta$ varies from zero to 180 degrees and the opposite phase as $\theta$ varies from 180 to 360 degrees. It can be shown that the addition to the above-described signal appearing across the primary of transformer 82 of a second signal of constant amplitude having the same frequency (sin $\omega t$ variation) as the signal supplied to coil 80 and a phase corresponding to one of the two phases of the signal appearing across coil 80 will result in an output from the bridge rectifier circuit which is identical to curve 50 or 56 in FIG. 2 except that one period of the signal requires a full 360 degree variation in the relative bearing angle. This difficulty may be overcome by inserting a two-to-one speed changer between the antenna and the signal transmitter which energizes control transformer 78. The addition of this constant amplitude voltage may be made by inserting a transformer in one of the leads connecting coil 80 to the primary of transformer 82.

The advantage of applying the bottom clipping signal to the control grid of the cathode-ray tube indicator is that existing systems may be modified to conform to the teachings of the present invention at very little expense. However, where such modification can be easily made, it is preferable to supply the bottom clipping signal to an early video amplifier stage to avoid the possibility of saturation of the video amplifier by ground clutter signals.

The embodiments of the invention described above may be termed synchronous systems since the amplitude of the bottom clipping signal depends only on the position of the scanning antenna. FIG. 8 shows a non-synchronous embodiment of the invention. Blocks 16, 17, 18 and 20 correspond to similarly numbered blocks in FIG. 1. Video amplifier 106 in FIG. 8 may be similar to video amplifier stage 19 of FIG. 1. The output of video amplifier 106 is supplied to a low pass filter circuit 108. Filter 108 may be a simple R.C. filter network having a time constant long compared to individual target signals but short enough to pass the $\sin^2 \theta$ or $1 - \cos 2\theta$ variation of the average clutter signal amplitude. The output of filter 108 is supplied as a bottom clipping signal to video amplifier 106 in a manner similar to that shown in FIG. 1. The operation of the embodiment shown in FIG. 8 is substantially the same as the embodiment of FIG. 1, the major difference being that, in the system shown in FIG. 8, the bottom clipping signal is generated by an actual measurement of the average clutter amplitude whereas, in the embodiment shown in FIG. 1, a bottom clipping signal is generated which approximates a previously determined variation in clutter signal amplitude. Filter 108 forms a part of a degenerative feedback loop which keeps the average output of video amplifier 106 substantially at a zero level. Gain may be provided in the feedback loop in order to reduce still further the average output of video amplifier 106. The relatively long time constant of filter 108 permits the short duration target signals to pass to amplifier 20 without appreciable attenuation.

While there has been described what is at present considered to be the preferred embodiment of the invention, it will be obvious to those skilled in the art that various changes and modifications may be made therein without departing from the spirit and scope of the invention as defined by the hereinafter appended claims.

What is claimed is:

1. An airborne moving target detection system comprising means for generating time-spaced energy pulses, an antenna coupled to said pulse generating means for radiating said pulses in a beam directed toward the surface of the earth, said beam being positionable in azimuth to vary the relative angle between the direction of said beam and the ground track of said system, a receiver coupled to said antenna for detecting ground and target-reflected echoes of said radiated pulses, a fixed target signal cancellation unit connected to the output of said receiver, said fixed target signal cancellation unit passing signals representing moving targets while at least partially blocking signals representing fixed targets, means for generating a signal having an amplitude substantially equal to the instantaneous average amplitude of the residual ground clutter signal appearing at the output of said cancellation unit, and signal utilization means connected to the output of said cancellation unit and to the output of said signal generating means, said signal utilization means being constructed and arranged to provide an output signal indicative of the instantaneous difference between the amplitude of the output signal of said signal cancellation unit and the amplitude of the output signal of said signal generating means.

2. An airborne moving target detection system comprising means for generating time-spaced energy pulses, an antenna coupled to said pulse generating means for radiating said pulses in a beam directed toward the surface of the earth, said beam being positionable in azimuth to vary the relative angle between the direction of said beam and the ground track of said system, a receiver coupled to said antenna for detecting ground and target-reflected echoes of said radiated pulses, a fixed target signal cancellation unit connected to the output of said receiver, said fixed target signal cancellation unit passing signals representing moving targets while at least partially blocking signals representing fixed targets, means for generating a signal having an amplitude substantially equal to the instantaneous average amplitude of the residual ground clutter signal appearing at the output of said cancellation unit, and amplifier-indicator means having first and second signal inputs connected, respectively, to the output of said cancellation unit and to the output of said signal generating means, said amplifier-indicator means being constructed and arranged to provide a visual indication indicative of the instantaneous difference between the amplitude of the output signal of said signal cancellation unit and the amplitude of the output signal of said signal generating means.

3. An airborne moving target detection system comprising means for generating time-spaced energy pulses, an antenna coupled to said pulse generating means for radiating said pulses in a beam directed toward the surface of the earth, said beam being positionable in azimuth to vary the relative angle between the direction of said beam and the ground track of said system, a receiver coupled to said antenna for detecting ground and target-reflected echoes of said radiated pulses, a fixed target signal cancellation unit connected to the output of said receiver, said fixed target signal cancellation unit passing signals representing moving targets while at least partially blocking signals representing fixed targets, means for generating a signal having an amplitude substantially equal to the instantaneous average amplitude of the residual ground clutter signal apearing at the output of said cancellation unit, means for subtractively combining said last-mentioned generated signal and the output signal of said signal cancellation unit, and means for utilizing the difference signal resulting from said subtractive combination.

4. In an airborne moving target detection system including means for generating time-spaced energy pulses, antenna coupled to said pulse generating means for radiating said pulses in a beam directed toward the surface of the earth, said beam being positionable in azimuth to vary the relative angle between the direction of said beam and the ground track of said system, a receiver coupled to said antenna for detecting ground and target-reflected echoes of said radiated pulses, a fixed target signal cancellation unit connected to the output of said receiver, said fixed target signal cancellation unit passing signals representing moving targets while at least partially blocking signals representing fixed targets, and an indicator for displaying signals supplied by said cancellation unit, means for generating a signal which varies in amplitude with variations in the azimuthal position of said beam, the amplitude of said generated signal being substantially equal to the instantaneous average residual ground clutter signal at the output of said cancellation unit, means for subtractively combining said last-mentioned generated signal and the output signal of said cancellation unit, and means for causing the difference signal resulting from said combination to actuate said indicator.

5. In an airborne moving target detection system including means for generating time-spaced energy pulses, an antenna coupled to said pulse generating means for radiating said pulses in a beam directed toward the surface of the earth, said beam being positionable in azimuth to vary the relative angle between the direction of said beam and the ground track of said system, a receiver coupled to said antenna for detecting ground and target-reflected echoes of said radiated pulses, a delay and subtraction type fixed target signal cancellation unit connected to the output of said receiver, and an indicator for displaying signals supplied by said cancellation unit, signal averaging means connected to the output of said cancellation unit, said signal averaging means being constructed and arranged to generate a signal equal in amplitude to the instantaneous average output signal of said cancellation unit, means connected to the output of said cancellation unit and to the output of said signal averaging means for providing a difference signal equal to the instantaneous difference between the amplitude of the output signal of said cancellation unit and the amplitude of the signal of said signal averaging means and means for supplying said difference signal to said indicator.

6. In an airborne moving target detection system including means for generating time-spaced energy pulses, an antenna coupled to said pulse generating means for radiating said pulses in a beam directed toward the surface of the earth, said beam being positionable in azimuth to vary the relative angle between the direction of said beam and the ground track of said system, a receiver coupled to said antenna for detecting ground and target-reflected echoes of said radiated pulses, a delay and subtraction type fixed target signal cancellation unit connected to the output of said receiver, and an indicator for displaying signals supplied by said cancellation unit, means coupled to said antenna for generating a signal the amplitude of which varies approximately as a $\sin^2$ function of the relative bearing of said radiated beam with respect to the ground track of said system, means electrically connecting said last-mentioned signal generating means and said cancellation unit to said indicator, said connecting means being arranged to cause the effective signal supplied to said indicator to be proportional to the instantaneous difference between the amplitude of the output signal of said cancellation unit and the amplitude of said last-mentioned generated signal.

7. In an airborne moving target detection system including means for generating time-spaced energy pulses, an antenna coupled to said pulse generating means for radiating said pulses in a beam directed toward the surface of the earth, said antenna being positionable in azimuth to vary the relative angle between the direction of said beam and the ground track of said system, a receiver coupled to said antenna for detecting ground and target-reflected echoes of said radiated pulses, a delay and subtraction type fixed target signal cancellation unit connected to the output of said receiver, and an indicator for displaying signals supplied by said cancellation unit, means coupled to said antenna for generating a signal the amplitude of which varies approximately as $F + E \cos 2\theta$, where E and F are constants and $\theta$ is the relative bearing of the radiated beam with respect to the ground track of said system, the amplitude of said last-mentioned generated signal for any relative bearing $\theta$ being substantially equal to the average amplitude of the signal in the output of said cancellation unit resulting from ground clutter at said relative bearing $\theta$, means electrically connecting said last-mentioned signal generating means and said cancellation unit to said indicator, said connecting means being arranged to cause the effective signal supplied to said indicator to be proportional to the instantaneous difference between the output amplitude of the signal of said cancellation unit and the amplitude of said last-mentioned generated signal.

8. In an airborne moving target detection system including means for generating time-spaced energy pulses, an antenna coupled to said pulse generating means for radiating said pulses in a beam directed toward the surface of the earth, said beam being positionable in azimuth to vary the relative angle between the direction of said beam and the ground track of said system, a receiver coupled to said antenna for detecting ground and target-reflected echoes of said radiated pulses, a delay and subtraction type fixed target signal cancellation unit connected to the output of said receiver, and an indicator for displaying signals derived from said cancellation unit, means mechanically coupled to said antenna for generating a signal which varies approximately as $|R \sin \theta|$ where R is a constant, $\theta$ is the relative bearing of the radiated beam with respect to the ground track of the system and the brackes | | denote the instantaneous magnitude of the expression included therein, the constant R of said last-mentioned generated signal being selected to cause said signal |R sin θ| to be approximately equal to the average amplitude of the signal in the output of said cancellation unit resulting from ground clutter for a selected range of realtive bearing angles, and means for subtractively combining said last-mentioned generated signal and the output signal of said cancellation unit to provide an output signal substantially free of ground clutter signal.

9. An airborne moving target detection system comprising means for generating time-spaced pulses of electromagnetic energy, an antenna coupled to said pulse generating means for radiating said pulses in a beam directed toward the surface of the earth, said antenna being positionable in azimuth to vary the relative bearing of said beam with respect to the ground track of said system, a receiver electrically coupled to said antenna for detecting ground and target-reflected echoes of said radiated pulses, a delay and subtraction fixed target signal cancellation unit connected to the output of said receiver, a signal ratio device including a rotatable control element arranged to provide an output signal equal to $E \sin \phi$, where E is the amplitude of the input signal supplied to said signal ratio device and $\phi$ is the angular position of said control element with respect to a reference position, means connecting said control element to said antenna, said connecting means being arranged to maintain the relationship $\phi = 2\theta$ where $\theta$ is the relative bearing of said beam with respect to said ground track, a source of bias potential connected in series with the output of said signal ratio device, a differential signal combining stage connected to the output of said cancellation unit and to the series combination of said signal ratio device and said bias source, said differential combining stage being arranged to provide an output signal proportional to the difference in the amplitude of the signals supplied thereto.

10. In an airborne moving target detection system comprising means for generating time-spaced pulses of electromagnetic energy, an antenna electrically coupled to said pulse generating means for radiating said pulses in a beam directed toward the surface of the earth, said antenna being positionable in azimuth to vary the relative bearing of said beam with respect to the ground track of said system, a receiver electrically coupled to said antenna for detecting ground and target-reflected echoes of said radiated pulses, a delay and subtraction fixed target signal cancellation unit connected to the output of said receiver, and means for supplying a signal equal to R sin θ, where R is a constant and θ is the relative bearing of said beam with respect to the ground track of said system, means responsive to said last-mentioned signal for providing a signal equal to |R sin θ|, where the brackets denote the instantaneous magnitude of the expression included therein, a source of bias potential and means responsive jointly to the output signal of said cancellation unit and to the sum of said signal |R sin θ| and said bias signal, and arranged to provide a signal which is indicative of the difference, if any, between the output signal from said cancellation unit and said sum of said other two signals.

11. A system according to claim 10 wherein said last-mentioned means comprises a cathode-ray indicator tube, wherein the output of said cancellation unit is connected to one element of the control grid-cathode system of said cathode-ray tube, and wherein the sum of said bias signal and said |R sin θ| signal is supplied to the other element of said control grid-cathode system.

12. In an airborne moving target detection system including means for generating time-spaced energy pulses, an antenna electrically coupled to said pulse generating means for radiating said pulses in a beam directed toward the surface of the earth, said beam being positionable in azimuth to vary the relative angle between the direction of said beam and the ground track of said system, a receiver electrically coupled to said antenna for detecting ground and target-reflected echoes of said radiated pulses, a delay and subtraction type fixed target signal cancellation unit connected to the output of said receiver, and an indicator for displaying signals supplied by said cancellation unit, a rectifier connected to the output of said cancellation unit, a low-pass filter connected to the output of said rectifier, means responsive to the output signals of said cancellation unit and said low-pass filter for providing a difference signal equal to the instantaneous difference between the output signal of said cancellation unit and the output signal of said low-pass filter, and means for supplying said difference signal to said indicator.

13. In an airborne moving target detection system including means for generating time-spaced energy pulses, an antenna electrically coupled to said pulse generating means for radiating said pulses in a beam directed toward the surface of the earth, said antenna being positionable in azimuth to vary the relative angle between the direction of said beam and the ground track of said system, a receiver electrically coupled to said antenna for detecting ground and target-reflected echoes of said radiated pulses, a fixed target signal cancellation unit connected to the output of said receiver, said fixed target signal cancellation unit passing signals representing moving targets while at least partially blocking signals representing fixed targets, and an indicator for displaying signals supplied by said cancellation unit, a mechanically adjustable signal ratio device, means for supplying a signal of controllable amplitude to the input of said signal ratio device, means mechanically coupling said signal ratio device to said antenna so as to cause the output signal of said signal ratio device to be equal to $E \cos 2\theta$, where $\theta$ is the angle between the direction of said beam and the ground track of said system and E is a constant, a source of bias signal, means for combining said signal $E \cos 2\theta$ and said bias signal, the combined signal for any angle $\theta$ being substantially equal to the average amplitude of the signal in the output of said cancellation unit resulting from ground clutter at said angle θ, and means electrically connecting said signal combining means and said cancellation unit to said indicator, said connecting means being arranged to cause the effective signal supplied to said indicator to be proportional to the instantaneous difference between the output signal of said cancellation unit and said combined signal.

References Cited in the file of this patent

UNITED STATES PATENTS

| | | |
|---|---|---|
| 2,437,173 | Rutherford | Mar. 2, 1948 |
| 2,523,283 | Dickson | Sept. 26, 1950 |
| 2,532,546 | Forbes | Dec. 5, 1950 |
| 2,570,203 | Busignies | Oct. 9, 1951 |
| 2,678,440 | Watt | May 11, 1954 |
| 2,754,506 | Page | July 10, 1956 |